US008085415B2

(12) United States Patent
Nagami

(10) Patent No.: US 8,085,415 B2
(45) Date of Patent: Dec. 27, 2011

(54) PRINTER, CONTROL PROGRAM AND PRINTING DEVICE

(75) Inventor: Masahiro Nagami, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 904 days.

(21) Appl. No.: 12/055,627

(22) Filed: Mar. 26, 2008

(65) Prior Publication Data

US 2008/0239361 A1  Oct. 2, 2008

(30) Foreign Application Priority Data

Mar. 27, 2007  (JP) ................................. 2007-082112

(51) Int. Cl.
*G06F 3/12* (2006.01)

(52) U.S. Cl. ........... 358/1.14; 358/1.15; 399/81; 399/82

(58) Field of Classification Search ........ 358/1.12–1.18; 399/81, 82
See application file for complete search history.

(56) References Cited

U.S. PATENT DOCUMENTS

| | | | |
|---|---|---|---|
| 6,332,170 B1 * | 12/2001 | Ban .................................. | 710/6 |
| 6,724,492 B1 * | 4/2004 | Iwase et al. ................... | 358/1.13 |
| 7,456,980 B2 * | 11/2008 | Kuboki ........................ | 358/1.13 |
| 2001/0004241 A1 * | 6/2001 | Fukano et al. ................ | 340/692 |
| 2007/0177185 A1 * | 8/2007 | Ogura et al. ................. | 358/1.14 |
| 2008/0068642 A1 * | 3/2008 | Takahashi .................... | 358/1.15 |
| 2008/0180743 A1 * | 7/2008 | Uruta et al. .................. | 358/1.15 |
| 2008/0266588 A1 * | 10/2008 | Inaba ........................... | 358/1.13 |

FOREIGN PATENT DOCUMENTS

| | | |
|---|---|---|
| JP | 9-107469 A | 4/1997 |
| JP | 2004-094312 | 3/2004 |
| JP | 2004-102960 A | 4/2004 |
| JP | 2004-146972 A | 5/2004 |
| JP | 2004-260616 A | 9/2004 |
| JP | 2006-218732 A | 8/2006 |
| JP | 2007-050628 A | 3/2007 |

OTHER PUBLICATIONS

JP Office Action dtd Feb. 24, 2009, JP Appln. 2006-03603, partial translation.
JP Decision to Refusal dtd May 19, 2009, JP Appln. 2007-082112, partial English translation.
JP Office Action dtd Jan. 25, 2011, JP Appln. 2007-82112, English Translation.

* cited by examiner

*Primary Examiner* — Chan Park
(74) *Attorney, Agent, or Firm* — Banner & Witcoff, Ltd.

(57) ABSTRACT

A printer includes a receiving unit configured to receive a print job; a printing unit which executes a printing process to print an image on a recording medium based on the print job received by the receiving unit; a suspending unit which suspends the printing process based on suspension information added to the print job; an indicating unit which indicates that the printing is in process during suspension of the printing process; and a re-starting unit which re-starts the printing process suspended by the suspending unit.

14 Claims, 3 Drawing Sheets

PRINTER, CONTROL PROGRAM AND PRINTING DEVICE

CROSS-REFERENCE TO RELATED APPLICATION

This application claims priority from Japanese Patent Application No. 2007-082112, filed on Mar. 27, 2007, the entire subject matter of which is incorporated herein by reference.

TECHNICAL FIELD

Aspects of the present invention relate to a printer, a control program, and a printing system.

BACKGROUND

JP-A-2004-94312 describes a related-art printer. The printer includes a receiving unit which receives a print job, a printing unit which executes a printing process to print an image on a recording medium based on the print job received by the receiving unit, and a suspending unit which suspends the printing process based on suspension information added to the print job.

The related-art printer having such a configuration is capable of suspending a printing process as shown in the example described below.

That is, when a user transmits a print job, which includes confidential content, from a computer to the printer, the print job is added to suspension information. In this case, in the printer, the receiving unit receives the print job added with suspension information, and the suspending unit suspends a printing process based on the suspension information. In the meantime, if the user cancels suspension of the printing process after the user moves from an installation place of the computer to an installation place of the printer, the printing unit re-starts the printing process based on the print job. Accordingly, the user can securely acquire a recording medium on which an image is printed, that is, printed matter. Thus, with the printer, it becomes possible to prevent other users from looking at the printed matter on which confidential content is printed, or to prevent other users from erroneously taking it away.

In the related-art printer described above, it may be possible to securely prevent other users from looking at a printed matter on which confidential information is printed. However, when a specified printing process is suspended before the printing unit starts a printing process based on a print job, in other words, when the printing process is suspended in a state where no page is printed, a waiting time of a user from re-start of the printing process to an end of the printing process may become longer.

For this reason, it is considerable that the printing process is suspended after a part of the printing process is executed when the printing unit starts the printing process based on a print job. In this case, the waiting time of a user from a re-start of the printing process to an end of the printing process can be shortened. However, in this case, since the printer becomes in a standby state during suspension of the printing process, other users mistakenly conclude that the printing process has finished, and therefore, the other users may take away printed matter that is halfway printed.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a printer by which other users may recognize that the printing is in process during suspension of the printing process.

The above and other aspects of the present invention are accomplished by providing a printer comprising: a receiving unit configured to receive a print job; a printing unit which executes a printing process to print an image on a recording medium based on the print job received by the receiving unit; a suspending unit which suspends the printing process based on the suspension information added to the print job; an indicating unit which indicates that the printing is in process during suspension of the printing process; and a re-starting unit which re-starts the printing process suspended by the suspending unit.

According to the above configuration, it may be possible to prevent other users from looking at printed matter on which confidential content is printed or from erroneously taking it away by suspending the printing process.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Hereinafter, exemplary embodiments of the present invention will be described with reference to the drawings.

Exemplary Embodiment

Figure 1:
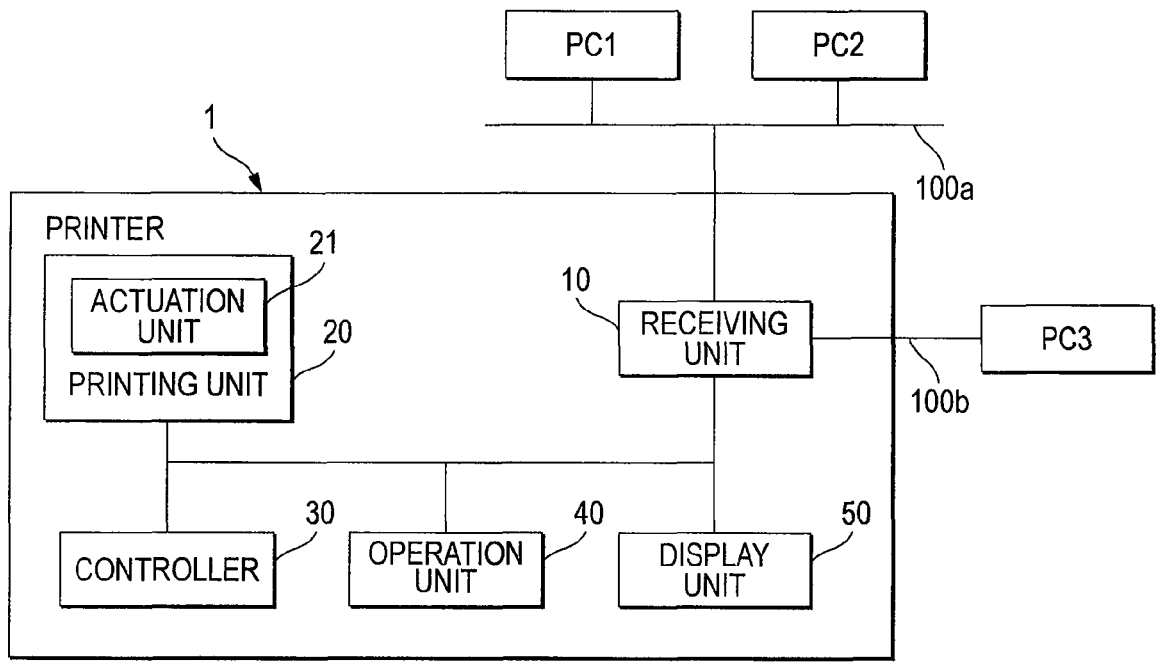
FIG. 1 is a schematic block diagram showing a printer and a printing system according to an exemplary embodiment of the present invention.

As shown in FIG. 1, a printer 1 according to an exemplary embodiment of the present invention includes a receiving unit 10, a printing unit 20, a controller 30, an operation unit 40 and a display unit 50.

The receiving unit 10 is coupled to a plurality of computers (for example, PC1, PC2, etc.) in a network through a network line 100a, or is coupled to a computer (for example, PC3) through a USB cable 100b, and receives print jobs transmitted from the computers PC1, PC2 or PC3, etc.

The printing unit 20 may adopt an electronic photography type, an ink jet type or other general printing system, and executes a printing process to print images on sheets or OHP sheets (hereinafter, simply called a "sheet") as a recording medium based on print jobs received by the receiving unit 10. The printing unit 20 includes an actuation unit 21 that operates during a printing process. For example, the actuation unit 21 may convey sheets, transfer a coloring material onto the sheets and perform maintenance on the printing unit 20. The actuation unit 21 is utilized in the "Delay Mode" described later.

The controller 30 includes a CPU, a ROM, a RAM, etc., and controls the printing unit 20, the display unit 50, etc., based on a print job received by the receiving unit 10 and inputs to the operation unit 40 described later. Further, the controller 30 is provided with a control program to execute the "Delay Mode" described later.

Figure 2:
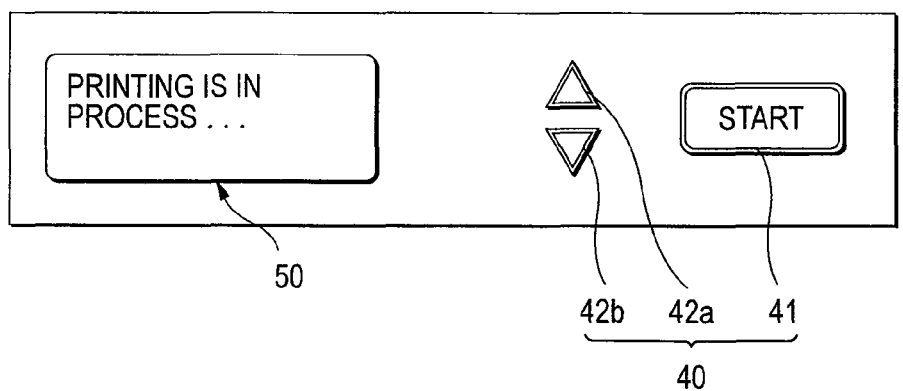
FIG. 2 is a schematic view showing an operation unit and a display unit of the printer according to an exemplary embodiment of the present invention.

As shown in FIG. 2, the operation unit 40 includes a start button 41, and selection buttons 42a and 42b. The start button 41 and the selection buttons 42a, 42b are disposed at a position where it is easy for a user to operate, for example, at the front side of the casing of the printer 1. In response to pressing these buttons, information can be transmitted to the controller 30. The start button 41 and the selection buttons 42a, 42b are utilized for operation to re-start printing in the "Delay Mode" described later.

As shown in FIG. 2, the display unit 50 is disposed adjacent to the operation unit 40, and displays a status of the printer 1 sent from the controller 30 to a user and displays the alternatives pertaining to setting of the printing process. The display unit 50 maybe utilized in the "Delay Mode" described later.

The printer 1 is included in a printing system along with the computers PC1, PC2, PC3, etc. And, for example, if a user transmits a print job from the PC1, PC2 or PC3, the receiving unit 10 receives the print job. And, since the controller 30 controls the printing unit 20, the printing unit 20 executes a printing process based on the print job, and it becomes possible to print an image on a sheet.

However, for example, it is assumed that the installation place of the computer PC1 is distant from the installation place of the printer 1. When a user transmits a print job including confidential content from the computer 1 to the printer 1, printed matter is discharged on to a discharge tray of the printer 1 if the printing unit 20 of the printer 1 executes a printing process as it is. Then, the printed matter will remain as it is until the user reaches the installation place of the printer 1 from the installation place of the computer PC1. As a result, other users may look at the printed matter on which the confidential content is printed or erroneously take away the printed matter.

To prevent such a situation, in the printer 1 according to the exemplary embodiment of the present invention, the controller 30 is provided with a control program to execute a "Delay Mode" that suspends the printing process. The control program includes a delay routine (Step S100 through Step S130) shown in FIG. 4.

Figure 3:
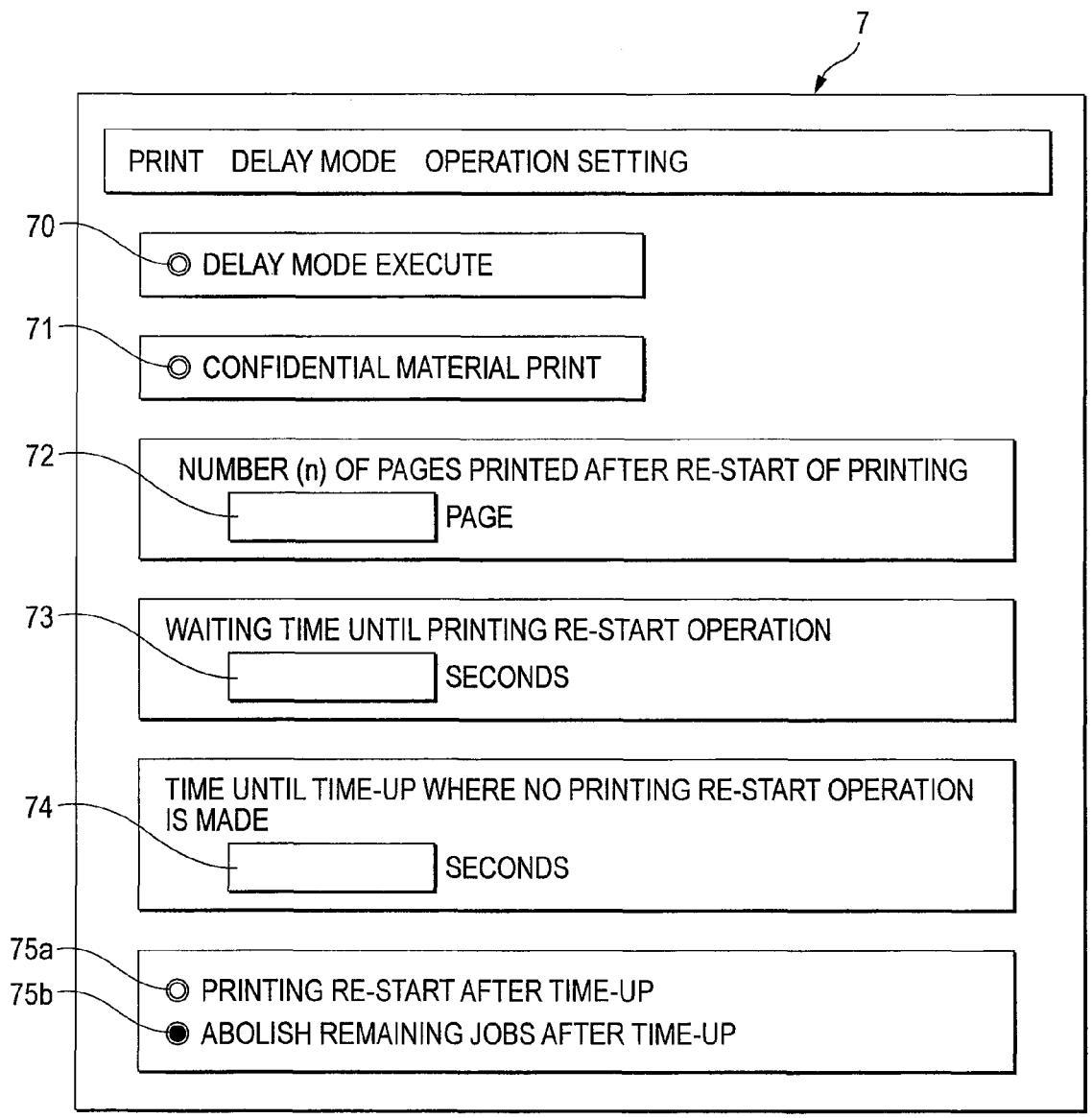
FIG. 3 is a view describing a user interface for setting operation of a delay mode in the printer according to an exemplary embodiment of the present invention.

A user interface 7 for "Delay Mode Operation Setting" shown in FIG. 3 is appropriately displayed on the display device of the computers PC1, PC2, PC3, etc., coupled to the printer 1 in order to set suspension information pertaining to the "Delay Mode".

The user interface 7 for "Delay Mode Operation Setting" is displayed when setting the delay mode in print setting of a print job which is to be transmitted to the printer 1. The user interface 7 includes a "Delay Mode Execute" check button 70, a "Confidential Material Print" check button 71, a "Number (n) of pages printed after re-start of printing" setting column 72, a "Waiting time until printing re-start operation" setting column 73, a "Time until time-up where no printing re-start operation is made" setting column 74, a "Printing re-start after time-up" check button 75a, and a "Abolish remaining jobs after time-up" check button 75b. Upon executing a setting operation with respect to these, the setting details will be reflected in the suspension information added to a print job. The suspension information is received by the receiving unit 10 of the printer 1 along with the print job, and is referenced by the controller 30 when the delay routine is executed.

In detail, the "Delay Mode Execution" check button 70 is disposed at an uppermost stage of the user interface 7. The check button 70 is checked when executing the "Delay Mode" in relation to a print job to be transmitted to the printer 1. It is noted that the check button 70 may be configured so that the inputted setting is made into the internal setting of the printer 1 by inputting from the operation unit 40 of the printer 1 whether the "Delay Mode" is actuated.

The "Confidential Material Print" check button 71 is disposed below of the check button 70. Normally, if a next print job by the same user exists when the printing process is executed in the "Delay Mode", it may be advantageous that the "Delay Mode" is applied to the next print job after all the pages of the preceding print job are printed, in view of that the time until a user acquires the printed matter of the preceding print job and the next print job after having operated the operation unit 40 of the printer 1 can be further shortened while preventing other users from erroneously taking away the printed matter. However, although it can be prevented that the printed matter is erroneously taken away by other users, for example, where strictly confidential content of the confidential material, etc., is contained after the n-th page counting from the end of the print job, the user would like to prevent the strictly confidential content from being printed while the user is not by the printer 1. Therefore, when the user does not want to re-start the printing process so that other users can not see even if a next print job by the same user exists, the check button 71 is checked. Accordingly, information indicating that cancel of suspension of the printing process in relation to the print job, that is, re-starting the printing process is not allowed is reflected in the suspension information.

On the other hand, if the check button 71 is not checked, information indicating that cancel of the suspension of the printing process in relation to a print job, that is, re-starting the printing process is allowed is reflected in the suspension information.

The "Number (n) of pages printed after re-start of printing" setting column 72 is disposed below the check button 71, wherein an "n" value is reflected in the suspension information by inputting the "n" value ("n" is an integral number and more than one). If a user wants to shorten the waiting time after re-start of printing, the user may set the "n" smaller. Also, assuming that pages containing confidential information start from the m-th page counting from the end of the document, if the user sets "n" to "m" (n=m), the printing process is suspended before the pages containing confidential content is printed. Accordingly, it is possible to securely prevent the confidential content from being seen by others. In addition, the setting column 72 may be configured so that the value of "n" is made into internal setting of the printer 1 by inputting the value of "n" from the operation unit 40 of the printer 1.

The "Waiting time until printing re-start operation" setting column 73 is disposed below of the setting column 72, where in a waiting time until printing re-start operation (herein referred to as "first limitation time") is reflected in the suspension information by inputting desired time in the setting column 73. For example, if it takes time until a user being distant from the printer 1 reaches the installation place of the printer 1, the first limitation time maybe set to be longer than the moving time of the user. Accordingly, it can become less likely for other users to re-start the printing process. And, it may be configured that, by inputting the value of the first limitation time from the operation unit 40 of the printer 1, the value of the first limitation value is made into the internal setting of the printer 1.

The "Time until time-up where no printing re-start operation is made" setting column 74 is disposed below the setting column 73, wherein the time until time-up where no printing re-start operation is made (hereinafter referred to as "second limitation time") is reflected in the suspension information by inputting the desired time in the setting column 74. By appropriately setting the time, it is possible to prevent such a situation where it troubles other users due to a suspended state of the printing process being prolonged. It is noted that it may be configured that by inputting the value of the second limitation time from the operation unit 40 of the printer 1, the value of the second limitation time is made into the internal setting of the printer 1.

The "Printing re-start after time-up" check button 75a and the "Abolish remaining jobs after time-up" check button 75b are disposed below the setting column 74. For example, if the remaining print job contains confidential content, a user may check "Abolish remaining jobs after time-up" check button 75b. In this case, the print process is discontinued (ends) after the second limitation time set in the setting column 74 is up. Accordingly, the confidential content would not be seen by other users. On the other hand, if "Printing re-start after time-up" check button 75a is checked, all of the printed matter can be acquired even after the second limitation time set in the setting column 74 is up. That is, with these check buttons 75a and 75b, the mode in which a printing process is re-started after the second limitation time is up or the mode in which a printing process is discontinued can be set. And, if either of the check buttons 75a or 75b is selected and checked, the selection is reflected in the suspension information. Also, the check buttons 75a and 75b may be configured that by selectively inputting the "Printing re-start after time-up" or the "Abolish remaining jobs after time-up" from the operation unit 40 of the printer 1, the selected setting is made into the internal setting of the printer 1.

By setting the operation of the delay mode by the user interface 7, the user may transmit a print job added with suspension information to the printer 1. Alternatively, by setting the operation of the delay mode in the operation unit 40 of the printer 1, the user may cause a print job, which is transmitted from the computers PC1, PC2, PC3, etc., to the printer 1, to be added with suspension information.

Figure 4:
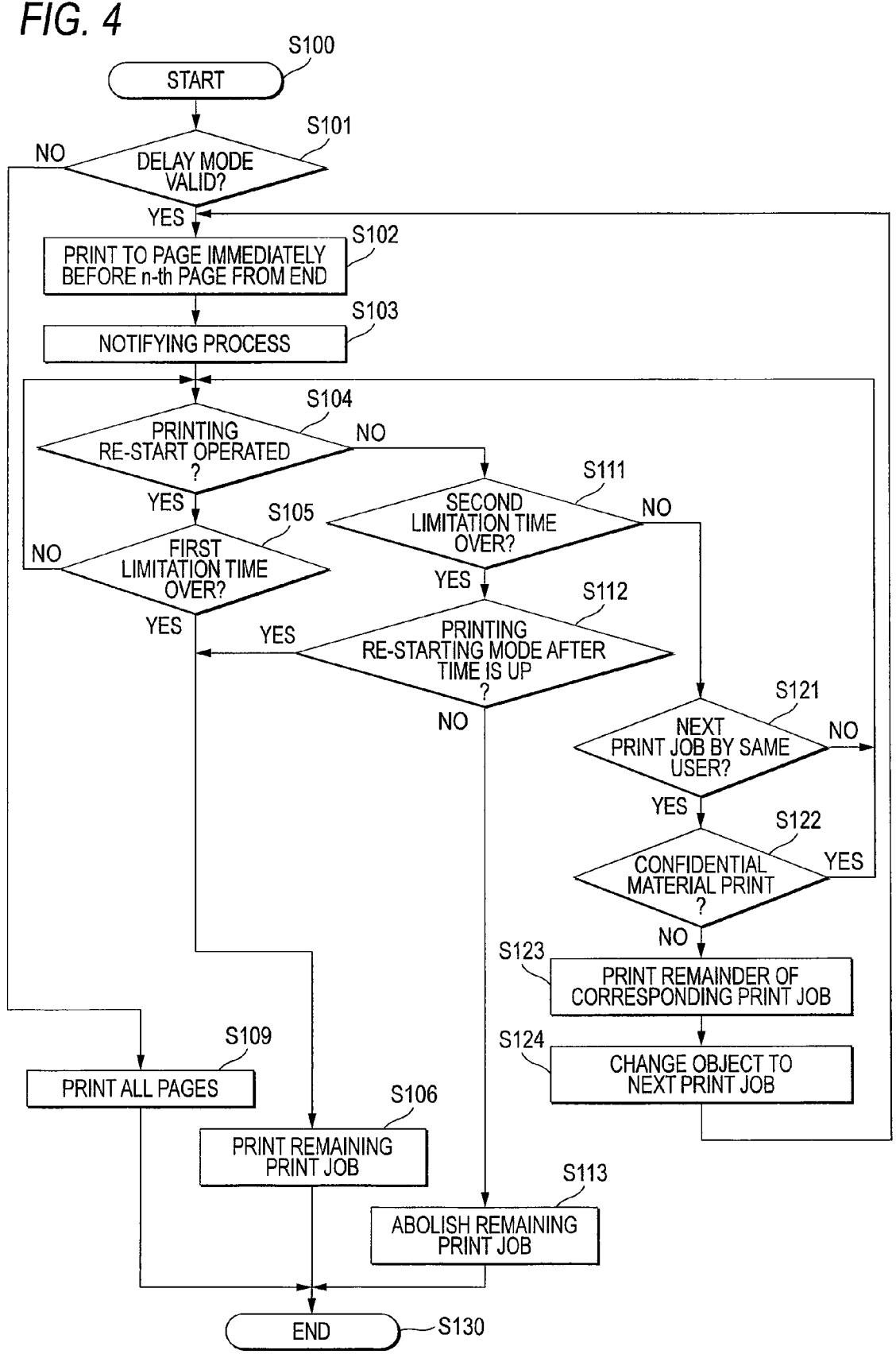
FIG. 4 is a flowchart showing a delay routine in the printer according to an exemplary embodiment of the present invention.

Next, a delay routine (Step S100 through Step S130) shown in FIG. 4 will be described.

The delay routine is timely executed when the printing unit 20 prints images on a recording medium based on a print job that the receiving unit 10 receives. At this time, the suspension information added to the print job is appropriately referenced.

First, the delay routine starts in Step S100. Then, it is determined whether the delay mode is valid in Step S101. Herein, if the "Delay Mode Execute" check button 70 is not checked, the delay mode is not valid and the process proceeds to Step S109, and all the pages are printed in the "Normal Printing Mode". And, the process proceeds to Step S130 and the delay routine ends.

On the other hand, if the check button 70 is checked, and therefore, it is determined that the delay mode is valid in Step S101, the process proceeds to Step S102.

Next, after printing is executed to the page immediately before (one page before) the n-th page counting from the end of the document, the printing process is suspended in Step S102. Herein the "n" has been set in the "Number (n) of pages printed after re-start of printing" setting column 72 described above.

Next, in Step S103, it is notified (indicated) that the printing is in process. Specifically, the controller 30 controls the display unit 50 to display characters of "Printing is in process" as shown in FIG. 2. Also, the controller 30 controls the printing unit 20 to perform a warm-up operation or a calibration operation in order to generate operation sounds similar to the operation sounds generated during the printing process or generates sound (onomatopoeia) imitating the operation sounds during the printing process and output through a speaker (not illustrated) included in the printer 1. And, the notification is continued until the process proceeds to Step S106 or Step S112 described later. It is noted that the warm-up operation is an action by which the printing process by the printing unit 20 is made immediately executable. The warm-up operation may include operating the actuation unit 21 to heat predetermined members, and to recover adhered matter that remains on predetermined members and adversely influence the printing quality. Also, the calibration operation is an action to adjust the density of coloring agents printed on sheets. The calibration operation may include operating the actuation unit 21 to print a density-adjusting pattern and recover adhered matter remaining on predetermined members due to printing of the pattern.

Thus, while printing is executed by the printing unit 20 to the page immediately before the n-th page counting from the end of the document, and it is notified that the printing is in process, the process is brought into a state of waiting for a re-starting operation of printing by a user in Step S104. Herein, the printing re-starting operation by the user is, for example, an operation determined in advance such as simultaneous long-pressing of the selection buttons 42a and 42b of the operation unit 40.

If a user executes a printing re-starting operation in Step S104, the process proceeds to Step S105. In Step S105, it is determined whether the elapse time from receiving a print job exceeds the first limitation time.

Herein, the first limitation time has been set in the "Waiting time until printing re-start operation" setting column 73 described above. And, when the elapse time from receiving of the print job exceeds the first limitation time, the process proceeds to Step S106. In this case, the user, who transmitted the corresponding print job, is likely to reach the installation place of the printer 1 and to execute the printing re-starting operation. And, in Step S106, the remaining print job, that is, pages from the n-th page counting from the end of a document to the end page thereof are printed. After that, the process proceeds to Step S130 and the delay routine ends.

Herein, when the elapse time from receiving of the print job does not exceed the first limitation time in Step S105, the user, who transmitted the corresponding print job, is not likely to reach the installation place of the printer 1 and another user is likely to execute a printing re-starting operation. Then, the printing process is not permitted to be re-started, and the process returns to Step S104.

On the other hand, in Step S104, when the user does not carry out a printing re-starting operation, the process proceeds to Step S111.

In Step S111, when the elapse time from suspension of the printing process exceeds the second limitation time, the process proceeds to Step S112. Here, the second limitation time has been set in the "Time until time-up where no printing re-start operation is made" setting column 74 described above.

In Step S112, it is determined which of the "Printing re-start after time-up" check button 75a and "Abolish remaining jobs after time-up" check button 75b has been selected. And, if the "Printing re-start after time-up" check button 75a has been selected, the process proceeds to Step S106. And, the remaining print job, that is, pages from the n-th page counting from the end of a document to the end page thereof are printed. After that, the process proceeds to Step S130 and the delay routine ends.

On the other hand, if "Abolish remaining jobs after time-up" check button 75b has been selected, the process proceeds to Step S113. Then, the remaining print job is abolished in Step S113, that is, printing of the n-th page counting from the end of a document through the end page thereof is discontinued. Then, the process proceeds to Step S130 and the delay routine ends. It is noted that, in the case where printing of the n-th page counting from the end of a document through the end page thereof is discontinued, the printing data from the n-th page counting from the end of a document through the end page thereof is abolished from a memory unit such as a RAM, etc., of the controller 30.

On the other hand, in Step S111, where the elapse time from suspension of the printing process does not exceed the second limitation time, the process proceeds to Step S121.

In Step S121, it is determined that whether next print job from the same user exists or not.

If next print job from the same user doe not exist in Step S121, the process proceeds to S104.

On the other hand, if a next print job from the same user exists, the process proceeds to S122.

In Step S122, it is determined whether the "Confidential material Print" has been checked.

If the "Confidential Material Print" check button 71 described above has been checked in relation to the corresponding print job in Step S122, suspension of the printing process is not canceled, that is, this means that the printing process can not be re-started, so that suspended confidential pages are not seen by other users even if a next print job from the same user exists. Then, process returns to Step S104.

On the other hand, if the check button 71 has been not checked in relation to the corresponding print job in Step S122, suspension of the printing process is canceled, that is, this means that the printing process may be re-started, if a next print job from the same user exists. Then, process proceeds to Step S123.

In Step S123, the remaining pages of the corresponding print job are printed, and the corresponding print job finishes. Next, the object print job processed by the delay routine is changed from the corresponding print job to a next print job in Step S124, and the process returns to S102.

In Step S102 from Step S124, the printing process is suspended after printing is executed to the page immediately before (one page before) the n-th page counting from the end with respect to the next print job based on the suspension information added to the next print job, and it is notified in Step S103 that the printing is in process. And, if the user reaches the installation place of the printer 1 and executes a printing re-starting operation, the remaining "n" pages of the next print job are printed. Then, the user can acquire the printed matter of the preceding print job and the next print job securely.

Here, according to the above exemplary embodiment, the printer 1 is capable of suspending a printing process, and re-starting the suspended printing process. Therefore, it is possible to prevent other users from looking at printed matter, on which confidential content is printed, and from erroneously taking away the same.

Further, the printer 1 is also capable of notifying (indicating) that the printing is in process during the suspension of the printing process Accordingly, with the printer 1 according to the exemplary embodiment, even during suspension of the printing process, it is possible to cause other users to recognize that the printing is in process. As a result, since it can become less likely for other users to mistakenly conclude that the printing process is completed, it is possible to further securely prevent other users from erroneously taking away the printed matter that is halfway printed.

Also, since, in the printer 1, the display unit 50 displays that the printing is in process, it is possible to further effectively cause other users to recognize that the printing is in process, through the sense of sight.

Further, since, in the printer 1, sound based on operation of the actuation unit 21 operating during a printing process is generated, it is possible to further effectively cause other users to recognize that the printing is in process, through the sense of hearing. At this time, where the warm-up operation is executed by operation of the actuation unit 21, it is possible to cause other users to recognize that the printing is in process, and at the same time, after the printing re-starting operation, the printing process can be executed soon. In addition, where the calibration operation is executed by operation of the actuation unit 21, it is possible to cause other users to recognize that the printing is in process, and at the same time, after re-start of printing, the printing quality can be maintained.

In addition, since, in the printer 1, the suspending unit suspends a printing process after printing is executed to the page immediately before (one page before) the n-th page from the end of a document, the waiting time of a user from re-starting of the printing process to completion thereof is not influenced by amount of the pages of the print job Further, since the value of "n" can be set, it is possible to set the number of the remaining pages corresponding to the user's need when the printing process is suspended. For this reason, it is possible to prevent a group of pages containing confidential content from being seen by others.

Further, since re-starting of a printing process is prohibited until the first limitation time elapses since a print job is received, it is possible to reduce the possibility of re-starting the printing process by other users before the user re-starts the printing process.

Still further, since re-starting or discontinuing a printing process can be selected based on the suspension information when the second limitation time elapses after the printing process is suspended, it is possible to prevent such a situation where it troubles other users due to a suspended state of the printing process being prolonged.

Also, since, in the printer 1, the printing process is controlled in a selected mode in which the printing process is re-started or the mode in which the printing process is discontinued, it becomes possible for a user to select the mode so that confidential pages are not seen by other users if there are any confidential pages in a print job.

Further, in the printer 1, where the "Confidential Material Print" check button 71 is not checked in relation to the corresponding print job, suspension of the printing process of the corresponding print job is canceled and suspends the printing process of a next print job by the same user, which is received subsequent to the corresponding print job. Therefore, where the user successively sends two print jobs, the printer 1 can prevent the waiting time of the user in front of the printer from being unnecessarily prolonged.

Further, since in the printer 1, the "Delay Mode" and "Normal Print Mode" are selectable, it is possible to selectively use the "Delay Mode" in which a printing process is suspended and the "Normal Printing Mode" in which a printing process is not suspended.

Also, a control program equipped in the printer 1 according to the exemplary embodiment can also bring about the actions and effects similarly to the above.

Further, the printing system including the printer 1 according to the exemplary embodiment and the above-described computes PC1, PC2, PC3, etc., according thereto can also bring about the actions and effects similarly to the above.

While the present invention has been shown and described with reference to certain exemplary embodiments thereof, it will be understood by those skilled in the art that various changes in form and details may be made therein without departing from the spirit and scope of the invention as defined by the appended claims.

For example, it may be configured that, when the "Confidential Material Print" check button 71 is checked, the "Abolish remaining jobs after time-up" check button 75b is automatically selected.

What is claimed is:

1. A printer comprising:
    a receiving unit configured to receive a print job;
    a printing unit which executes a printing process to print an image on a recording medium based on the print job received by the receiving unit;
    a processing unit; and
    memory having instructions stored thereon that, when executed by the processing unit, perform the steps of
    suspending the printing process based on suspension information added to the print job;
    indicating that the printing is in process while the printing process is suspended;
    re-starting the suspended printing process; and
    prohibiting the re-starting of the printing process until a first time period elapses after the receiving unit receives the print job,
    wherein the first time period is included in the suspension information added to the print job for which the printing process is suspended.

2. The printer according to claim 1, further comprising a display unit, wherein the step of indicating causes the display unit to indicate that the printing is in process while the printing process is suspended.

3. The printer according to claim 1, further comprising an actuation unit which operates during the printing process, wherein the step of indicating includes generating sound based on an operation of the actuation unit.

4. The printer according to claim 3, wherein the step of indicating controls the actuation unit to operate in order to generate sound of the operation of the actuation unit.

5. The printer according to claim 3, wherein the actuation unit comprises a maintenance unit which calibrates density of coloring agent printed by the printing unit.

6. The printer according to claim 3, further comprising a speaker, wherein the step of indicating causes the speaker to output the sound based on the operation of the actuation unit.

7. The printer according to claim 1, wherein the step of suspending suspends the printing process after the printing process is executed to a page immediately before an n-th page from an end page of all pages of the print job, wherein n is an integral number greater than one.

8. The printer according to claim 7, wherein the memory further has instructions stored therein that, when executed by the processing unit, perform the step of setting a value of n in accordance with a user input.

9. The printer according to claim 1, wherein the memory further has instructions stored therein that, when executed by the processing unit, perform the step of causing the printing unit to re-start the printing process or cancel the printing process, based on a setting of the printer or the suspension information when a second time period elapses after the step of suspending starts suspending the printing process.

10. The printer according to claim 9, wherein the memory further has instructions stored therein that, when executed by the processing unit, perform the step of receiving a selection of one of a mode for re-starting the printing process and a mode for canceling the printing process, wherein the step of causing controls the printing process in accordance with the selected mode.

11. The printer according to claim 1, wherein, when the receiving unit receives a second print job subsequent to a first print job from a same user as the first print job and when the suspension information added to the first print job or a setting of the printer does not indicate that cancellation of suspension of the printing process of the first print job is prohibited, the step of suspending suspends the printing process of the second print job without suspending the printing process of the first print job.

12. The printer according to claim 1, wherein the memory further has instructions stored therein that, when executed by the processing unit, perform the step of changing whether the step of suspending suspends the printing process based on a user input.

13. A non-transitory computer-readable medium having a computer program stored thereon and readable by a computer, the computer program, when executed by the computer, causes the computer to perform operations for controlling a printer which performs a printing process to print an image on a recording medium based on a print job received by the printer, the operations comprising:
    suspending the printing process based on suspension information added to the print job;
    indicating that the printing is in process while the printing process is suspended;
    re-starting the suspended printing process; and
    prohibiting the re-starting of the printing process until a first time period elapses after receiving the print job,
    wherein the first time period is included in the suspension information added to the print job for which the printing process is suspended.

14. A printing system comprising:
    a computer which transmits a print job;
    a printer comprising:
        a receiving unit configured to receive the print job transmitted from the computer;
        a printing unit which executes a printing process to print an image on a recording medium based on the print job received by the receiving unit;
        a processing unit;
        memory having instructions stored thereon that, when executed by the processing unit, perform the steps of:
        suspending the printing process based on suspension information added to the print job;
        indicating that the printing is in process while the printing process is suspended;
        re-starting the suspended printing process; and
        prohibiting the re-starting of the printing process until a time period elapses after the receiving unit receives the print job,
        wherein the time period is included in the suspension information added to the print job for which the printing process is suspended.

* * * * *

UNITED STATES PATENT AND TRADEMARK OFFICE
CERTIFICATE OF CORRECTION

| | | |
|---|---|---|
| PATENT NO. | : 8,085,415 B2 | |
| APPLICATION NO. | : 12/055627 | |
| DATED | : December 27, 2011 | |
| INVENTOR(S) | : Masahiro Nagami | |

It is certified that error appears in the above-identified patent and that said Letters Patent is hereby corrected as shown below:

On the title page, item (54) and col. 1, line 2, Title:
        Please replace "Printing Device" with --Printing System--

Signed and Sealed this
Third Day of July, 2012

David J. Kappos
*Director of the United States Patent and Trademark Office*